United States Patent
Dinauer et al.

(10) Patent No.: US 7,910,855 B2
(45) Date of Patent: Mar. 22, 2011

(54) NO GAP LASER WELDING OF COATED STEEL

(75) Inventors: William R. Dinauer, Hudson, WI (US); Kevin N. Klingbeil, Oakdale, MN (US)

(73) Assignee: LASX Industries, Inc., White Bear Lake, MI (US)

( * ) Notice: Subject to any disclaimer, the term of this patent is extended or adjusted under 35 U.S.C. 154(b) by 1213 days.

(21) Appl. No.: 11/534,814

(22) Filed: Sep. 25, 2006

(65) Prior Publication Data

US 2007/0084835 A1    Apr. 19, 2007

Related U.S. Application Data

(60) Provisional application No. 60/720,081, filed on Sep. 23, 2005, provisional application No. 60/720,404, filed on Sep. 26, 2005.

(51) Int. Cl.
*B23K 26/16* (2006.01)
*B23K 26/32* (2006.01)

(52) U.S. Cl. ............ 219/121.63; 219/121.64; 219/121.8

(58) Field of Classification Search ............. 219/121.63, 219/121.64, 121.76, 121.78–121.81, 121.85
See application file for complete search history.

(56) References Cited

U.S. PATENT DOCUMENTS

| | | | |
|---|---|---|---|
| 3,993,508 A | 11/1976 | Erlichman | |
| 4,000,392 A * | 12/1976 | Banas et al. | 219/121.63 |
| 4,224,501 A * | 9/1980 | Lindbom et al. | 219/124.34 |
| 4,563,617 A | 1/1986 | Davidson | |
| 4,642,446 A | 2/1987 | Pennington | |
| 4,691,093 A * | 9/1987 | Banas et al. | 219/121.63 |
| 4,873,415 A | 10/1989 | Johnson et al. | |
| 4,939,050 A | 7/1990 | Toyosawa et al. | |
| 5,082,160 A | 1/1992 | Leigh | |
| 5,106,707 A | 4/1992 | Catotti et al. | |
| 5,141,523 A | 8/1992 | Catotti et al. | |
| 5,162,172 A | 11/1992 | Kaun | |
| 5,163,499 A | 11/1992 | Newkirk et al. | |
| 5,187,346 A | 2/1993 | Bilge et al. | |
| 5,305,941 A | 4/1994 | Kent et al. | |
| 5,307,369 A | 4/1994 | Kimberlin | |
| 5,454,480 A | 10/1995 | Morris | |
| 5,526,867 A | 6/1996 | Keck et al. | |
| 5,582,750 A * | 12/1996 | Hamura et al. | 219/124.34 |
| 5,591,360 A | 1/1997 | Mombo-Caristan | |
| 5,595,670 A | 1/1997 | Mombo-Caristan | |

(Continued)

FOREIGN PATENT DOCUMENTS

JP    408010949 A  *  1/1996

(Continued)

OTHER PUBLICATIONS

Korinth, A., et al., "Remote welding impacts auto manufacture", *Industrial Laser Solutions*, pp. 26-31, May 2005.

(Continued)

*Primary Examiner* — Samuel M Heinrich

(74) *Attorney, Agent, or Firm* — Law Office of Scott C. Harris, Inc.

(57) ABSTRACT

Welding using a laser, which leaves keyhole portions at each pass, that allow gases to vent. That keyhole portion is an area within the interior portion, e.g., an inside of a spiral or a circular arc. The keyhole is not processed by the laser and gases can escape. The laser later circles back to process the area.

18 Claims, 2 Drawing Sheets

U.S. PATENT DOCUMENTS

| | | |
|---|---|---|
| 5,603,853 A | 2/1997 | Mombo-Caristan |
| 5,626,776 A | 5/1997 | Morris, Jr. |
| 5,651,903 A * | 7/1997 | Shirk .................. 219/121.64 |
| 5,783,622 A | 7/1998 | Sabata et al. |
| 5,867,886 A | 2/1999 | Ratell et al. |
| 5,946,798 A | 9/1999 | Buluschek |
| 6,093,884 A | 7/2000 | Toyomura et al. |
| 6,137,934 A | 10/2000 | Consonni |
| 6,184,457 B1 | 2/2001 | Tsuzuki et al. |
| 6,265,242 B1 | 7/2001 | Komori et al. |
| 6,291,761 B1 | 9/2001 | Takada et al. |
| 6,316,832 B1 | 11/2001 | Tsuzuki et al. |
| 6,350,326 B1 | 2/2002 | McCay et al. |
| 6,377,904 B1 * | 4/2002 | Yamashita .................. 702/150 |
| 6,479,168 B2 | 11/2002 | Mazumder et al. |
| 6,479,744 B1 | 11/2002 | Tsuzuki et al. |
| 6,522,815 B1 | 2/2003 | Staschewski |
| 6,528,756 B2 | 3/2003 | Degawa et al. |
| 6,608,278 B1 | 8/2003 | Xie et al. |
| 6,646,225 B1 | 11/2003 | Wang et al. |
| 6,652,990 B2 | 11/2003 | Carey, II et al. |
| 6,710,283 B2 * | 3/2004 | Mori et al. ............... 219/121.64 |
| 6,786,981 B2 | 9/2004 | Yazawa et al. |
| 6,794,603 B1 | 9/2004 | Musselman |
| 6,811,891 B2 | 11/2004 | Carey, II et al. |
| 6,844,522 B1 | 1/2005 | Wang et al. |
| 6,850,812 B2 | 2/2005 | Dinauer et al. |
| 6,858,322 B2 | 2/2005 | Carey, II et al. |
| 6,868,724 B2 | 3/2005 | Brzozowski et al. |
| 7,057,132 B2 * | 6/2006 | Beck et al. ............... 219/121.64 |
| 2002/0198622 A1 | 12/2002 | Dinauer et al. |
| 2004/0020902 A1 * | 2/2004 | McCoy et al. ............. 219/121.6 |
| 2005/0171630 A1 | 8/2005 | Dinauer et al. |

FOREIGN PATENT DOCUMENTS

| | | | |
|---|---|---|---|
| JP | 408118011 A | * | 5/1996 |
| JP | 409174266 A | * | 7/1997 |

OTHER PUBLICATIONS

Tzeng, Y-F., "Pulsed Nd:YAG Laser Seam Welding of Zinc-Coated Steel", *Welding Research Supplement*, pp. 238-244, Jul. 1999.

* cited by examiner

NO GAP LASER WELDING OF COATED STEEL

CROSS-REFERENCE TO RELATED APPLICATIONS

This application claims priority to U.S. Provisional Application Ser. No. 60/720,081, filed on Sep. 23, 2005 and 60/720,404, filed on Sep. 26, 2005. The disclosures of the prior applications are considered part of (and are incorporated by reference in) the disclosure of this application.

BACKGROUND

It is often difficult to weld metals that are formed of two different materials. For example, coated steel may be one metal that is difficult to weld—especially when the coating has a lower melting point than the base metal. Different welds of this type, including a lap joint, have been attempted. However, this has been a challenge.

One problem is that during the welding process, the coating may evaporate violently at the weld interface because of the coating's lower boiling point than the base metal. This may cause undesirable effects within the weld joints. This may also lead to defects, including high levels of porosity, as well as expulsion of the base metal from the weld pool.

Different approaches have been attempted to deal with this problem. One of the approaches uses a laser welding technique, with plural sheets, each in a vertical position. The weld is carried out from bottom to top in order to allow gravity to lengthen an area through which the vapors can escape. This approach has been difficult to use in production.

Another technique attempts to remove the coating prior to the weld. However, this requires additional processing, and hence can be relatively expensive.

Gap welding requires a constant joint gap during the weld process and hence may be difficult to maintain. The joint design may also be changed in order to attempt to allow an escape path for the gases from either one or both sides of the joint.

SUMMARY

The present application teaches a technique of using a laser to make welds, preferably on coated steel where the coating is of a lower boiling point than the base metal. The laser follows a path which defines an interior portion at each pass of the laser, leaves an area within that interior portion which is not processed by the laser at a first time, and through which gases can escape at that first time, and later returns to process said area.

In an embodiment, the laser follows a substantially spiral path, where elements which form the spiral may be of random geometric shapes. For example, in an embodiment, a broken spiral path is followed.

DETAILED DESCRIPTION

The general structure and techniques, and more specific embodiments which can be used to effect different ways of carrying out the more general goals, are described herein.

Figure 1:
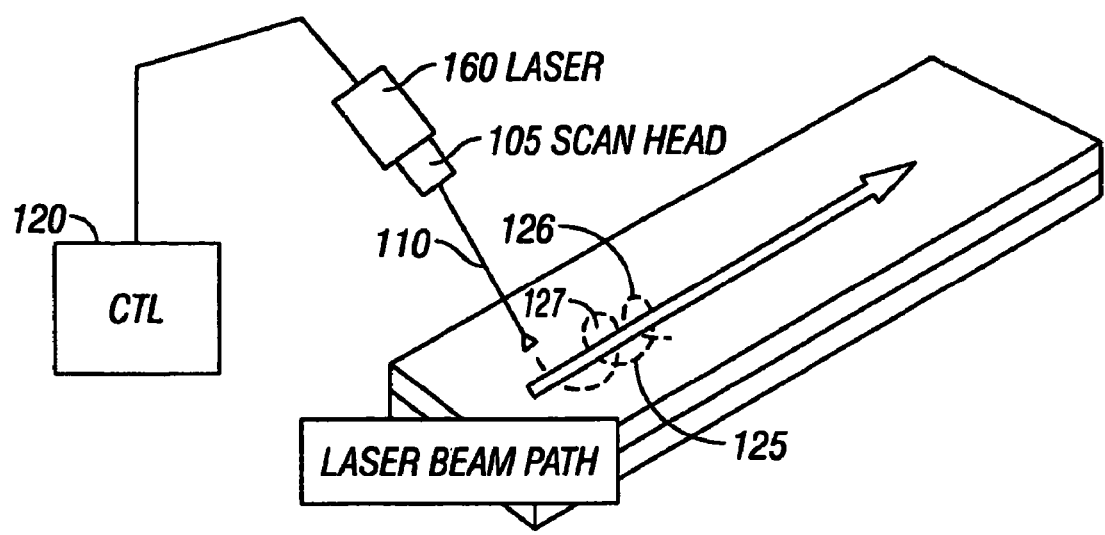
FIG. 1 illustrates a typical lap weld.

A structure used in an embodiment is shown in FIG. 1. A laser 100 is equipped with a scan head 105, which allows the laser output beam to be moved. The operation is controlled by a controller 120 which produces a signal that controls the output position of the laser beam 110. The laser can be a 2.5 kW $CO_2$ laser.

The laser traverses the path 125 as shown in FIG. 1. The path is a swirling path, and has outer edges 126, defining a "keyhole" 127 within the outer edges. Different paths can be used, as well as different directions. For example, while FIG. 1 shows a straight-line path overall, the path can be curved or can be in any other general shape. The term "swirling" is intended to denote any shape of any type that returns to itself, which can be formed of curved arcs or straight lines as parts of the swirl.

The technique does not require special positioning of the pieces, the pieces can be clamped tightly together, and the process can be used to laser weld those pieces anywhere that is required using normal laser weld techniques.

Figure 2A:
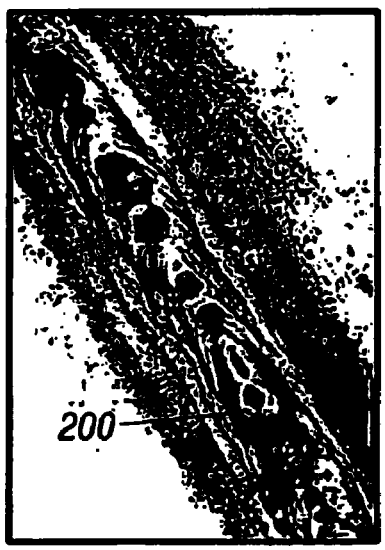
FIG. 2A shows a picture of a typical laser weld.

Conventional laser welding could produce violent outgassing of the coatings, which could cause explosion of the molten metal and messy welds. The present technique may avoid that by using the technique of leaving unprocessed areas or "keyholes". For example, laser welding with coated steel using normal welding procedures can produce the effect shown in FIG. 2A. This effect includes holes such as 200 which are caused by the expulsion of the molten material.

Figure 2B:
FIG. 2B shows a picture of a weld using the present techniques.

FIG. 2B illustrates a picture of the resultant weld using the present technique, with a swirl diameter of 2 mm, and a beam path speed of 60 mm per second. The weld is continuous, and no outgassing has been caused.

The applicants believe that the beam manipulation in this way allows the keyhole to stay open for an extended period of time as compared with straight-line welding. When manipulating the beam around the keyhole, the keyhole remains open for a relatively long period of time. This allows the gases from the coating to escape less violently than in the prior art. In addition, by overlapping the beam path, the liquid metal is disturbed in a way that allows air bubbles to escape before being trapped in the metal, but after solidification.

Figure 3:
FIG. 3 is an illustration of a beam path.
Figure 4:
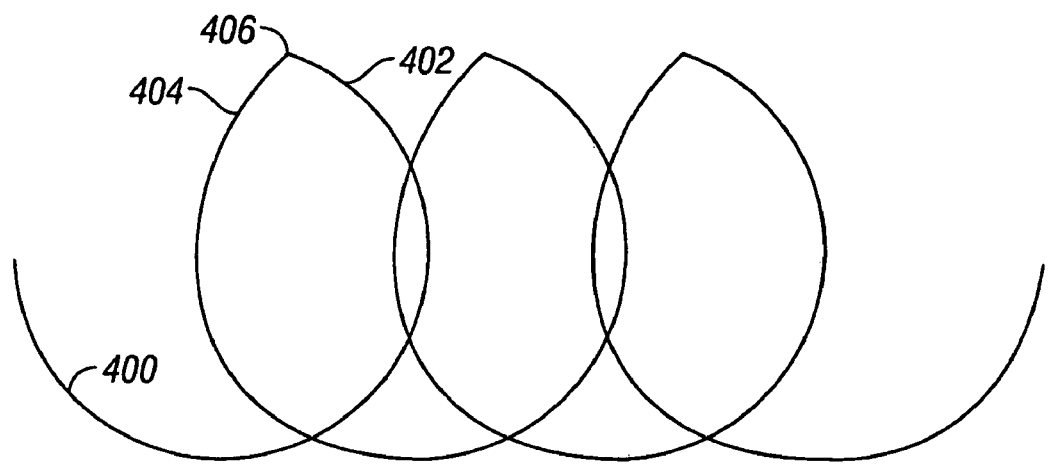
FIG. 4 is an enlargement of the illustration of the details of the beam path.

Different embodiments may use different overlapping patterns. For example, in an embodiment, a spiral pattern may be used. FIGS. 3 and 4 illustrate a particularly preferred pattern which is a modified form of spiral. The path 400 shown in FIG. 4 shows the modified spiral form, formed of generally arc shaped sections such as 402 and 404, which are joined at an area 406. Rather than a true spiral, this technique is formed by connected arcs, each forming a section of a circle, for example over 300°. Each arc then joins with another arc at the area 406. However, other different shapes are also contemplated, including concentric square shapes, or concentric curve type shapes of various forms including concentric curve type shapes formed from straight lines which are held together to form a curve.

In an embodiment, the amount of overlap needs to be great enough to allow for a large enough keyhole to allow for outgassing of the coating. However, the keyhole should not be so large so as to prevent an effective weld. Different embodiments describe different characteristics of that keyhole, using specific numbers.

In the first embodiment, described above, a swirl type shape is used with a diameter of 2 mm and a path speed of 60 mm per second, using laser power of about 1800 W, and a field of view of about 500 mm.

The material used may be 0.033/0.039 thick AISI CBDQSK to ASTM A620 Long Term coating to ASTM A308 carbon 10% maximum. The inventor believes that this material has a tin coating, but it may be lead. Either way, this material has an analogous effect to a zinc coating. The coating specifically has a lower melting point than the base material.

The general structure and techniques, and more specific embodiments which can be used to effect different ways of carrying out the more general goals are described herein.

Although only a few embodiments have been disclosed in detail above, other embodiments are possible and the inventor(s) intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other shapes beyond spirals can be used. In addition, other speeds and powers can be used, determined by computer or by trial and error.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be a Pentium class computer, running Windows XP or Linux, or may be a Macintosh computer. The computer may also be a handheld computer, such as a PDA, cellphone, or laptop.

Where a specific numerical value is mentioned herein, it should be considered that the value may be increased or decreased by 20%, while still staying within the teachings of the present application, unless some different range is specifically mentioned.

The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

What is claimed is:

1. A method, comprising:
    controlling a laser beam to carry out a weld with a material that has a base material and a coating and where the coating has a lower melting point than the base material, by first forming a beam that passes through a beam path that has a number of curved portions, where said curved portions of said beam path overlap one another to form an unprocessed area in a portion formed within a perimeter of said beam path, and
    at a second time after a time period that is effective to allow gases to escape from said unprocessed area, controlling said laser beam to said unprocessed area, to later process said unprocessed area at said second time; and
    controlling parameters of the laser beam to values which are effective to weld the material being welded.

2. A method as in claim 1, wherein said beam is substantially a spiral, and said unprocessed area is an area on the inside of a location of said path where multiple parts of said spiral meet to form the unprocessed area.

3. A method as in claim 1, wherein said beam is substantially multiple arcs of a circle which are connected together, and said unprocessed area is an area on the inside of a location on said path where multiple parts of said multiple arcs of said circle meet to form the unprocessed area.

4. A method as in claim 1, wherein said beam defines a curved beam path which repeats back on itself and forms open and unprocessed areas that are surrounded by areas of said beam path.

5. A method as in claim 1, wherein said controlling the laser beam comprises controlling a scan head associated with the laser beam to control an output position of the laser beam.

6. A method as in claim 1, wherein said laser is controlled to produce said beam along a path with a substantial diameter of approximately 2 mm, and a beam speed of 60 mm per second.

7. A method as in claim 1, wherein said unprocessed area is in substantially a center part of said area where said curved portions of said beam path overlap.

8. A laser beam system, comprising:
    a laser production device, which produces an output beam;
    a scan head moving device, which controls a position of said output beam based on an applied signal;
    a controller, which produces a signal to control said scan head moving device, said controller producing an output signal which is effective to allow welding using said output signal by producing an output beam at a value that is effective to melt a material being welded, and where said output beam is created along a beam path that has a number of curved portions, where said curved portions of said beam path overlap one another to form a first portion that has not been welded at a first time, and to allow molten material caused by the welding to escape through said first portion, and which beam returns back to said first portion to later process said first portion at a second time after said molten material caused by the welding at said first time has escaped.

9. A system as in claim 8, wherein said beam path is substantially a spiral.

10. A system as in claim 8, wherein said beam path is substantially multiple arcs of a circle which are connected together.

11. A system as in claim 8, wherein said beam path is a curved beam which repeats back on itself and forms open and unprocessed areas that are surrounded by areas of said beam path.

12. A system as in claim 8, wherein said controller produces said path with a substantial diameter of approximately 2 mm, and a beam speed of 60 mm per second.

13. A system as in claim 11, wherein said open and unprocessed areas are in substantially a center part of said open and unprocessed areas.

14. A method, comprising:
    controlling a laser beam to carry out a weld on a material that has a base material, and a coated material that has a lower melting point than the base material, in a way that defines a keyhole in an inner portion of the weld, and allows material to escape through said keyhole, and overlaps a beam path at a later time after said material has escaped, to later weld the area in the keyhole.

15. A method as in claim 14, wherein said beam path is substantially a spiral.

16. A laser beam controlling system, comprising:
    a controller that produces an output signal that causes a laser to follow a path which defines curves which overlap to form an interior portion inside the overlap of the curves, and leaves an area within that interior portion which is not processed by the laser and through which gases escape, and where said controller defines said path to return to said interior portion and process said interior portion using said laser only after said gases have escaped.

17. A system as in claim 16, wherein said path is a shape of substantially a spiral.

18. A system as in claim 16, wherein said interior portion is in substantially a center part of a portion of said path.

* * * * *